United States Patent [19]

Inukai

[11] Patent Number: 4,602,375
[45] Date of Patent: Jul. 22, 1986

[54] ONBOARD CLOCK CORRECTION BY MEANS OF DRIFT PREDICTION

[75] Inventor: Thomas Inukai, Gaithersburg, Md.

[73] Assignee: Communications Satellite Corporation, Washington, D.C.

[21] Appl. No.: 387,582

[22] Filed: Jun. 11, 1982

[51] Int. Cl.⁴ ............................................. H04B 7/185
[52] U.S. Cl. ..................................... 375/109; 370/104; 364/723
[58] Field of Search .................. 370/103, 104; 455/12, 455/13, 15, 51, 69, 71; 375/107, 111, 109; 331/1 A; 364/715, 723, 729, 735, 400, 480, 514, 700, 721; 368/46

[56] References Cited

U.S. PATENT DOCUMENTS

| | | | |
|---|---|---|---|
| 3,654,395 | 4/1972 | Schmidt | 455/12 |
| 3,781,706 | 12/1973 | Osborne et al. | 455/119 |
| 3,992,580 | 11/1976 | Bittel et al. | 370/103 |
| 4,048,563 | 9/1977 | Osborne | 455/12 |
| 4,144,414 | 3/1979 | Nicholas | 370/103 |

Primary Examiner—Benedict V. Safourek
Attorney, Agent, or Firm—Sughrue, Mion, Zinn, Macpeak, and Seas

[57] ABSTRACT

In an on-board satellite clock correction system of the type wherein phase errors between the satellite clock and a ground-based clock are determined and a clock correction value sent to the satellite, the clock correction value is determined by curve-fitting the determined phase errors in accordance with a polynomial function, updating the polynomial function coefficients so as to minimize discrepancy between the determined phase errors and those according to the polynomial function, predicting a clock drift in accordance with the polynomial function and calculating an error correction value in accordance with the predicted clock drift.

14 Claims, 26 Drawing Figures

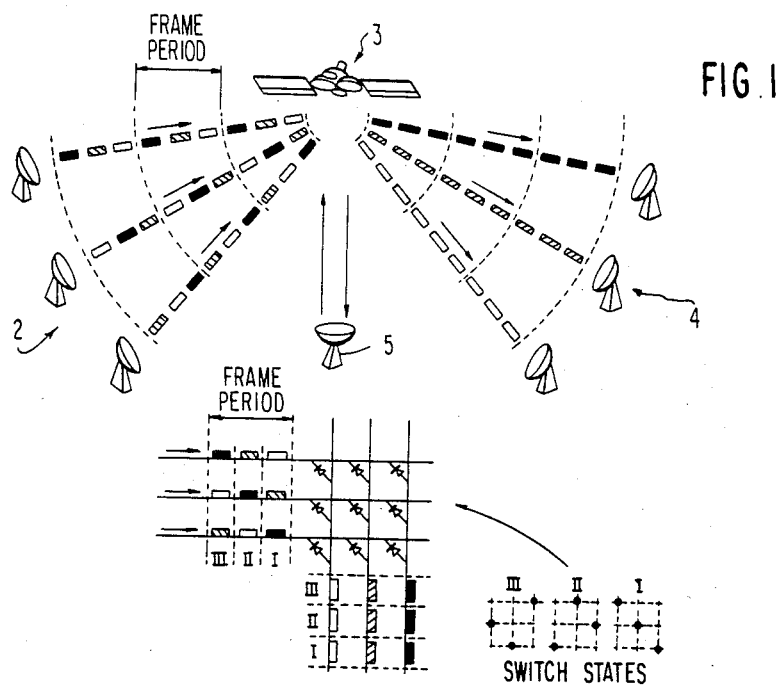
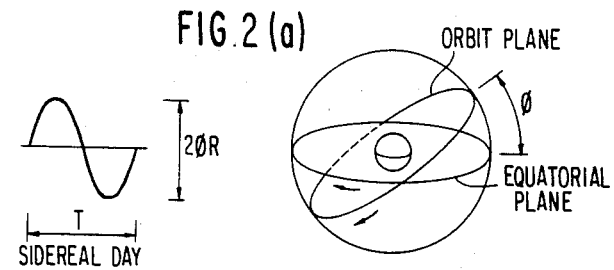
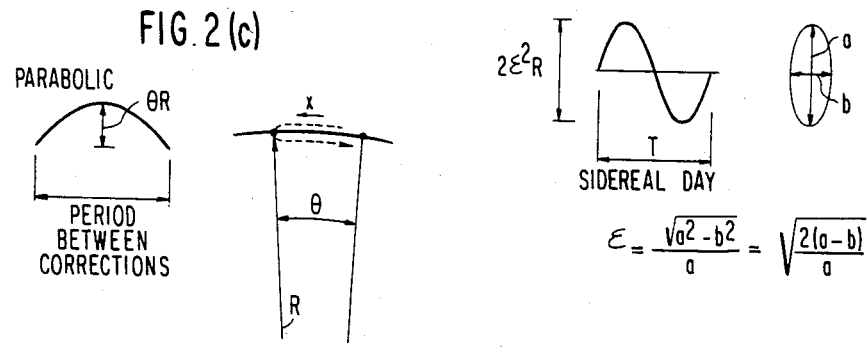

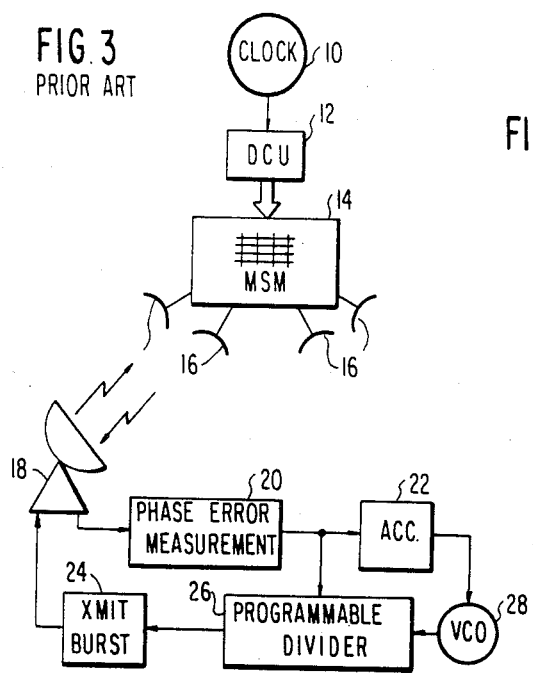
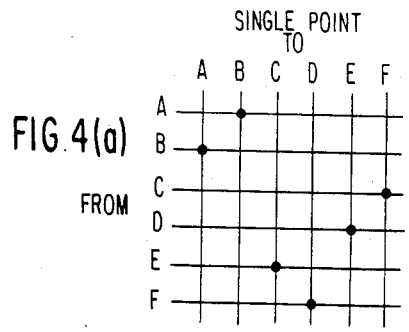
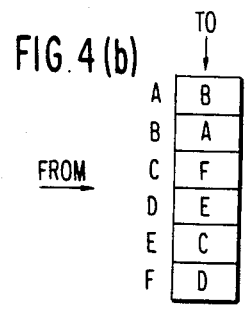
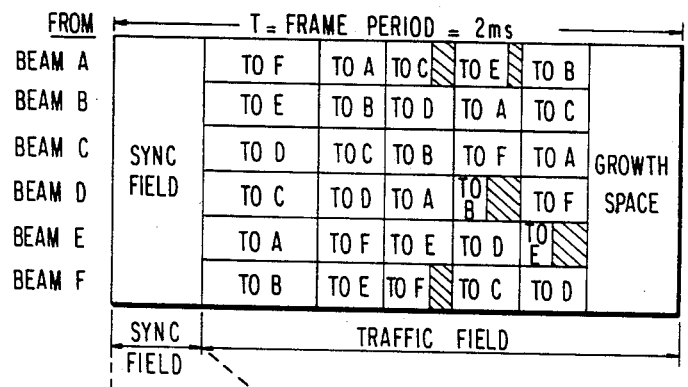
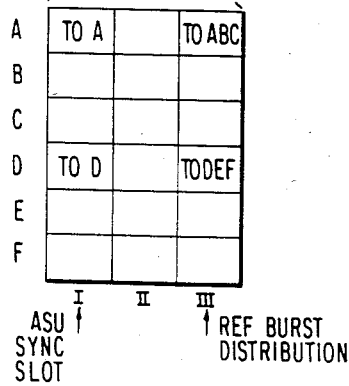
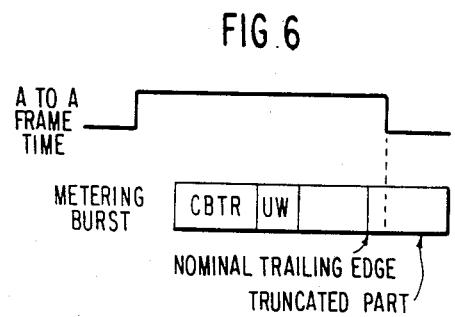

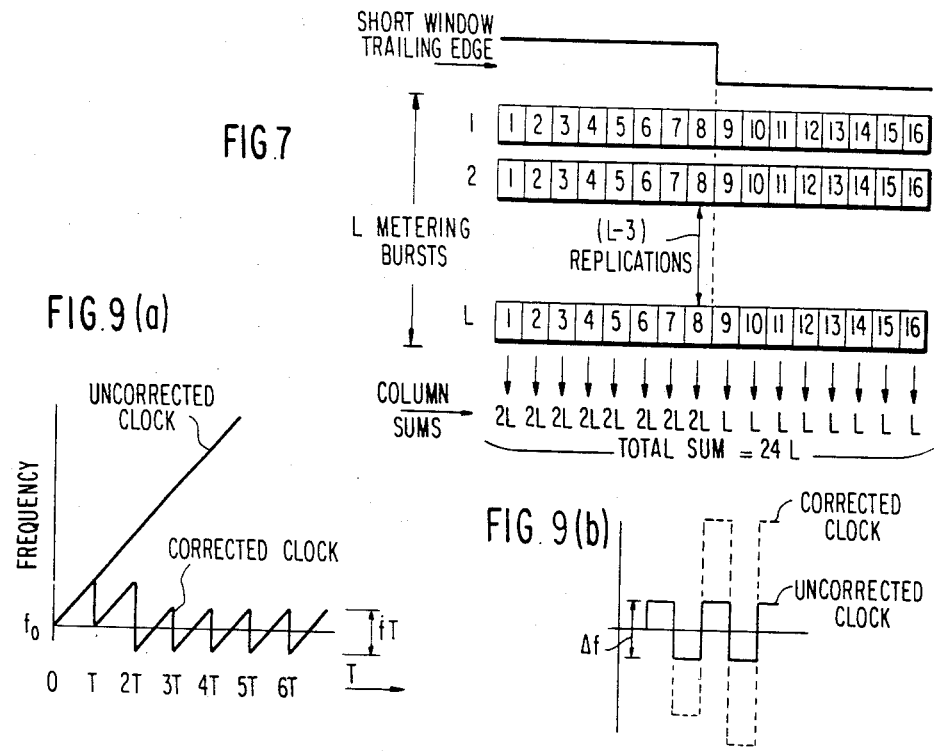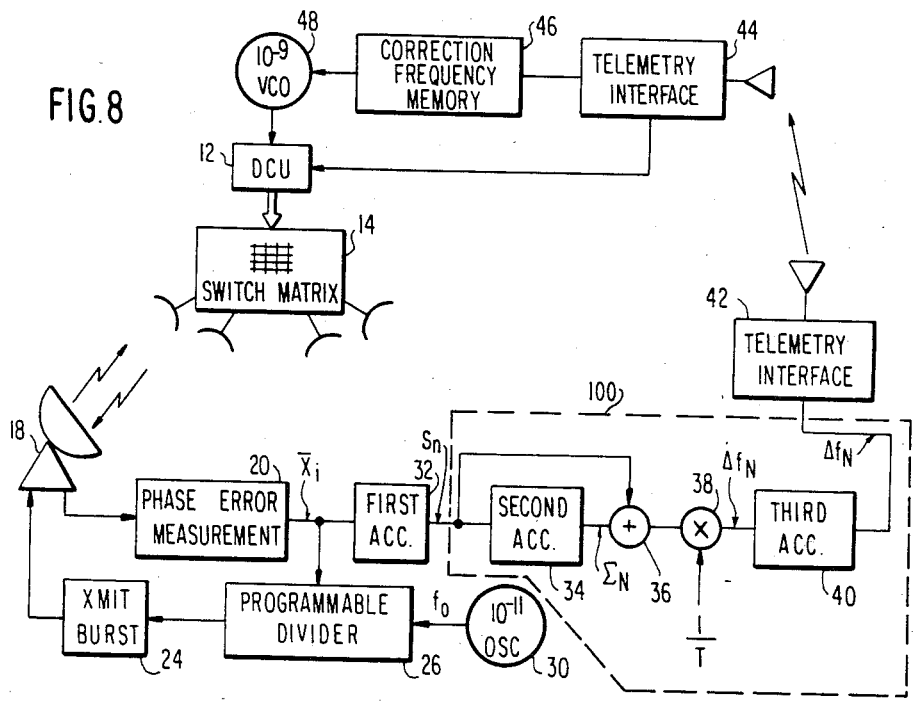

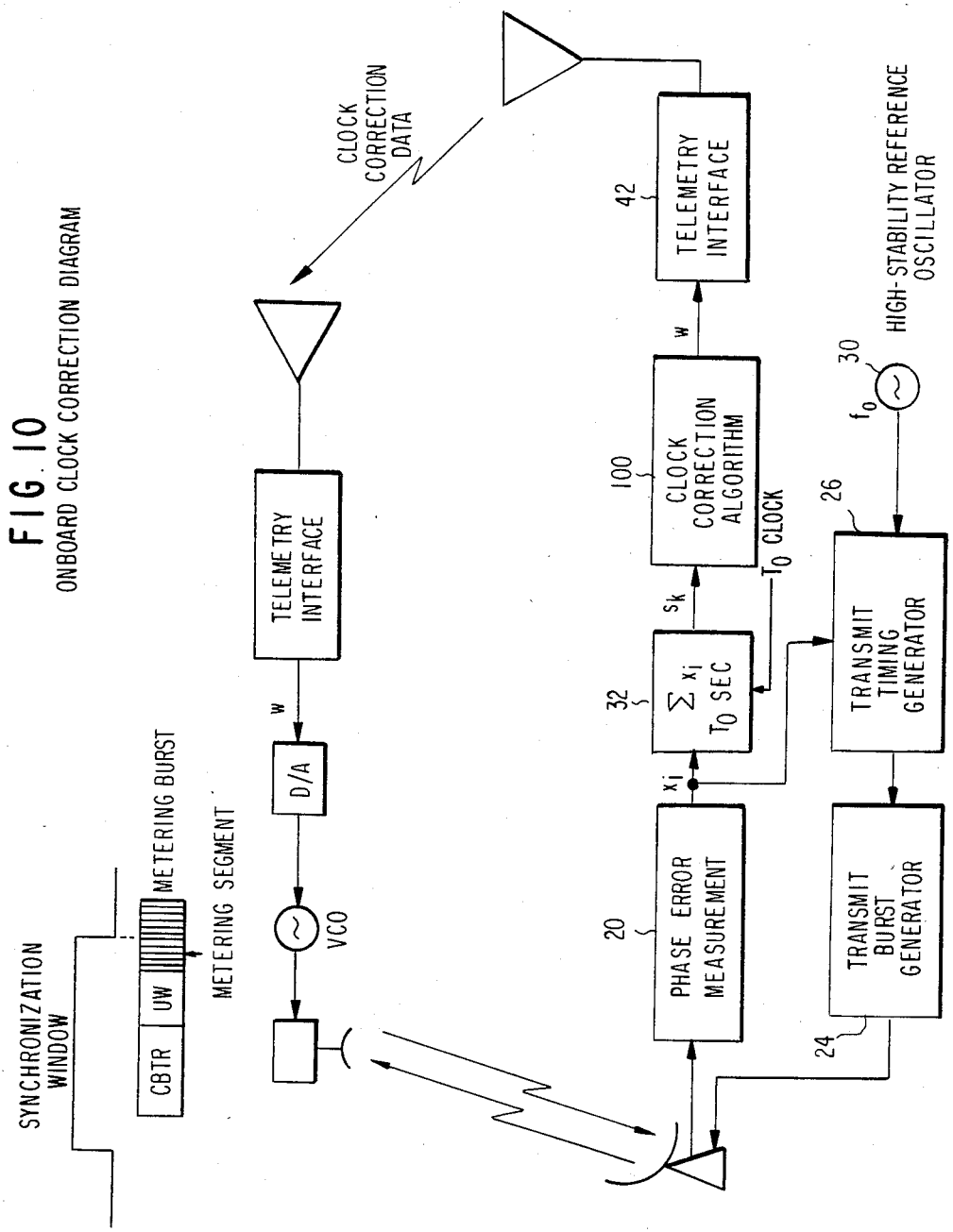

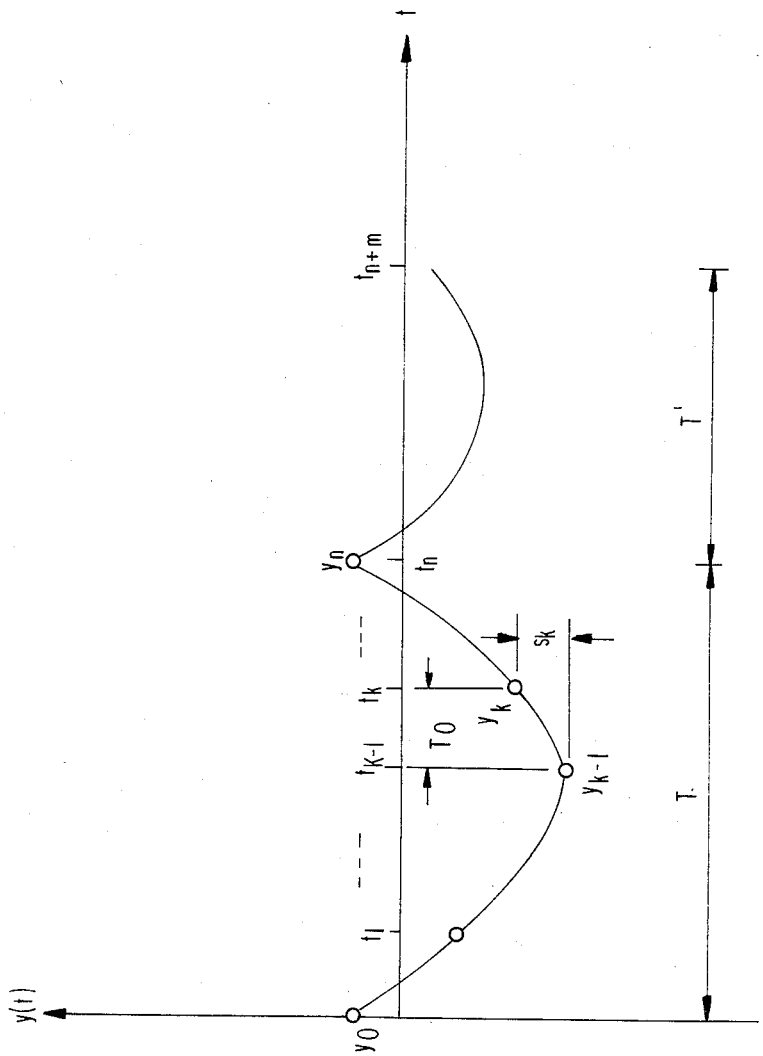

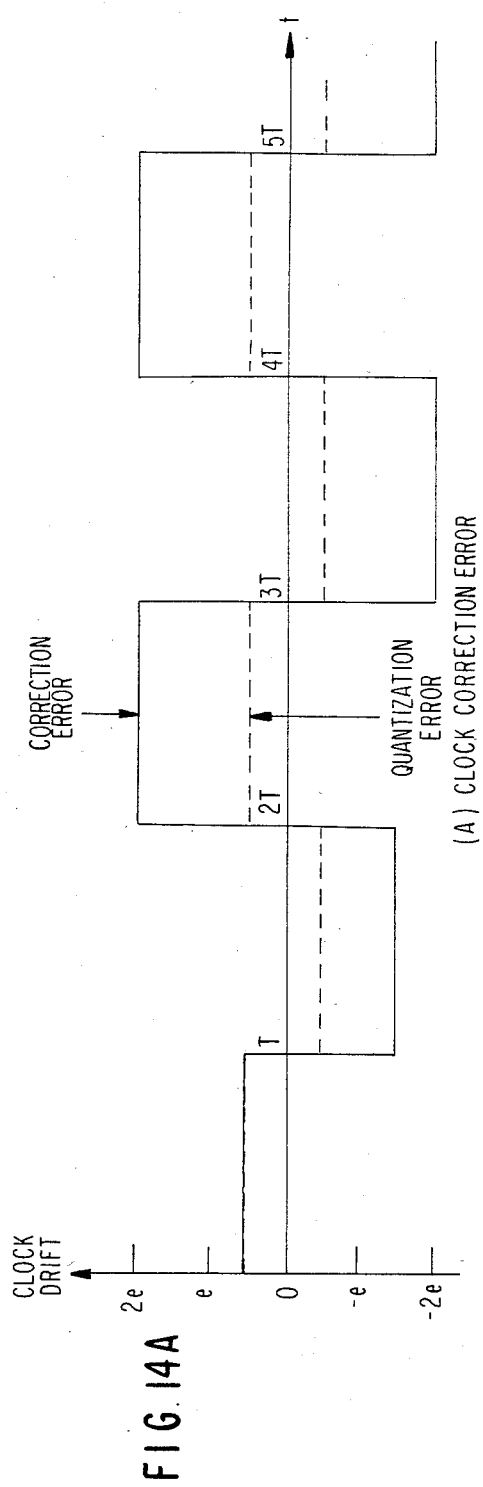
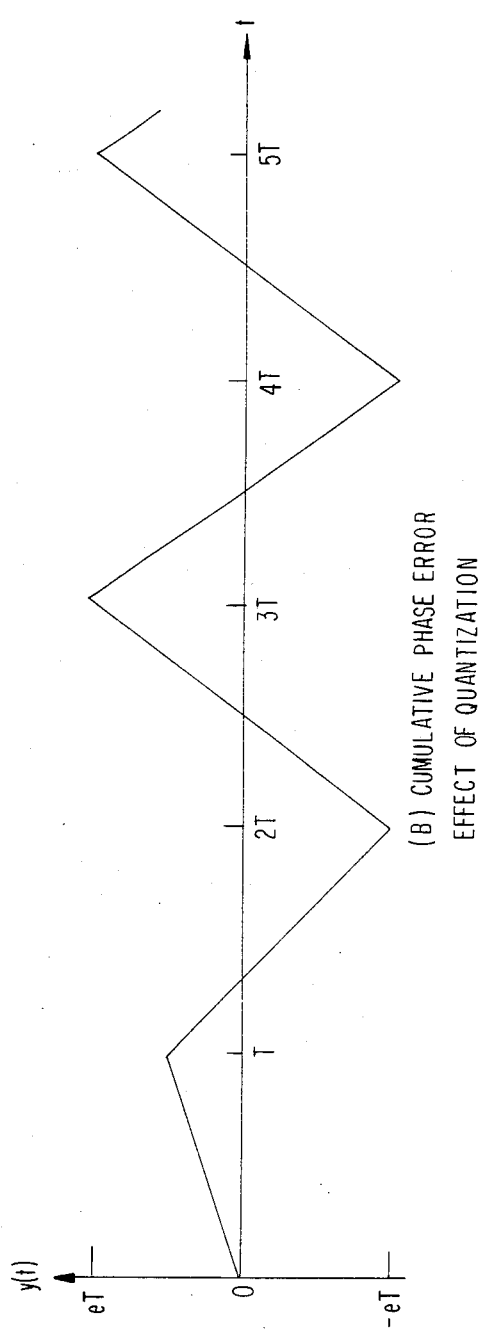
FIG. 14A  (A) CLOCK CORRECTION ERROR
FIG. 14B  (B) CUMULATIVE PHASE ERROR EFFECT OF QUANTIZATION FIG. 15A  EFFECT OF PREDICTION ERROR
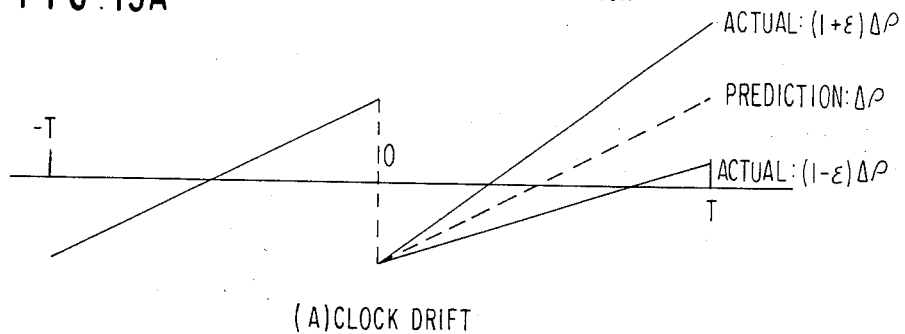
(A) CLOCK DRIFT
FIG. 15B
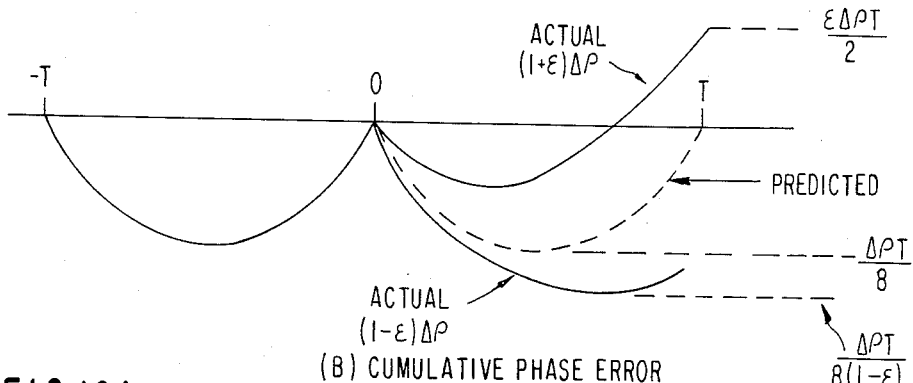
(B) CUMULATIVE PHASE ERROR
FIG. 16A
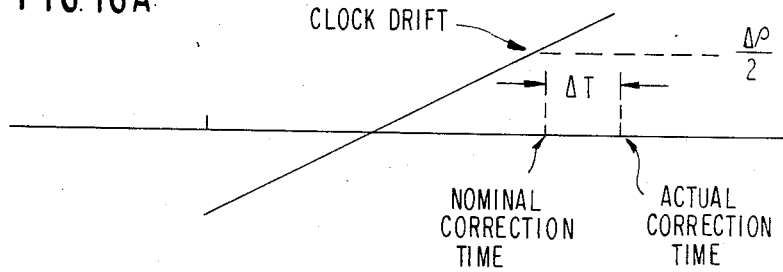
FIG. 16B
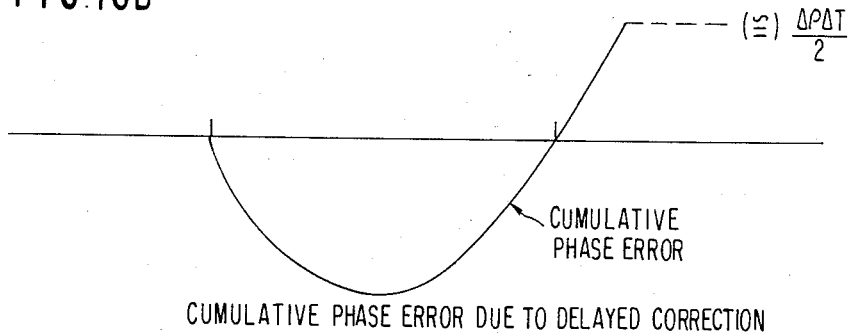
CUMULATIVE PHASE ERROR DUE TO DELAYED CORRECTION

ONBOARD CLOCK CORRECTION BY MEANS OF DRIFT PREDICTION

BACKGROUND OF THE INVENTION

The invention relates to a clock system for use in a satellite communications system. More particularly, the invention relates to such a clock system having an improved stability and reduced clock uncertainty.

SS-TDMA (satellite-switched time division multiple access) is being seriously considered for use in future international satellite systems. Such systems may use TDMA as a principal means for carrying communications information. Also, the use of multiple beams to achieve extensive frequency reuse is expected to become more prevalent.

In such systems, a satellite switch is used to achieve interconnections among the various beams. This allows TDMA traffic bursts transmitted on one beam to the satellite to be routed to any selected receiving location on a designated re-transmission or "down" beam from the satellite as required by a system traffic plan. The beam interconnections used in the switch are programmable and can be changed to optimize traffic flow.

FIG. 1 is a simplified representation of an SS-TDMA system with three transmitting stations 2 on the left and three receiving stations 4 on the right. (The transmitting and receiving stations are shown separately; however, they are actually colocated in pairs.) Data transmission occurs in TDMA frame periods with each transmitting station being assigned an "epoch" in the frame during which it can transmit traffic bursts designated for a particular down-beam. Such a satellite switch, shown schematically at the bottom of FIG. 1, routes the traffic bursts to the appropriate down-beams in accordance with a switch state program stored on board the satellite in a memory. In the example illustrated in FIG. 1 three stored switch states, designated I, II, and III, are sequentially used by the switch matrix at the appropriate times during the TDMA frame to achieve the necessary routing. These states occur in a frame period which is synchronized to the TDMA frame period. Control of the switch states and the frame period are administered by a satellite switch control earth station 5.

In the SS-TDMA system, timing of traffic station burst transmission and reception is governed by the period of the SS-TDMA switch frame. Proper synchronization must be achieved between the TDMA frame period and the timing of digital transmissions in the terrestrial system which it serves. Otherwise, serious loss of information will occur. Hence, any difference between the requirement to synchronize to the SS-TDMA frame period and the synchronization requirements at the terrestrial system interface must be reconciled.

It has been proposed that international interfaces between digital networks be interconnected by digital buffers designed to permit a time displacement of one primary multiplex frame, for example 125 $\mu$s, before a frame slip occurs to permit realignment of the digital transmission signals. It has been further proposed that the clock signals governing the timing of each network be controlled to an uncertaintly of $\pm 10^{-11}$ per day. For a typical primary multiplex rate of 2.048 Mbit/s, this leads to a primary multiplex frame slip of once every 72.34 days at an international digital interface. This is referred to as plesiochronous operation. If digital satellite links are to be compatible, the digital satellite system must operate within the constraints established for plesiochronous operation.

Thus, for successful operation in an SS-TDMA system, the SS-TDMA clock on board the satellite must exhibit a stability such that the resultant uncertainty does not cause a primary multiplex frame slip more than once every 72.34 days (for a primary multiplex rate of 2.048 Mbit/s). This means that the uncertainty averaged over 72.34 days must be no greater than $\pm 10^{-11}$ per day and that other short-term variations such as those due to satellite motion or the control mechanism must be absorbed within the digital satellite system.

A satellite never remains truly stationary; instead it moves about in a "box" centered at its nominal location. For example, for the satellite known as INTELSAT V, this box is defined by maximum variations of $\pm 0.1$ degrees in the east-west direction for long-term positional drift between position keeping exercises, $\pm 0.5$ degrees in the inclination of the oribital plane relative to the equatorial plane, and an orbital eccentricity of $\epsilon = 5 \times 10^{-4}$. These variational components are illustrated in FIGS. 2(a)-2(c). For the radius of the stationary orbit (41,600 km), the peak-to-peak long term east-west positional variation is 146 km, which occurs over a period of approximately 30 days between position-keeping exercises. The maximum peak-to-peak north-south positional variation due to orbital inclination is 728 km and is a sinusoidal function with a sidereal day period (86,160 sec.). The maximum altitude variation (given by $\pm R\epsilon$) is 42 km. The altitude variation is also a sinusoid function with a sidereal day period, but not necessarily in-phase with the north-south displacement sinusoid.

These variations dictate the size of buffers at earth station terminals needed to absorb path length changes. If the SS-TDMA frame period were established on board by a perfectly stable clock, the buffer at an earth station must only be large enough to absorb the path length change between the station and the satellite. Buffer size is usually expressed in terms of the propagation time of the radio frequency signal over the distance variation involved. The distance variation experienced by an earth station is composed of the projection of satellite position variation on the line of sight to the station. All variations given in the following discussion are peak-to-peak. For a station at the sub-satellite point, only the altitude variation is seen; hence, the buffer must be large enough to accommodate a sidereal day period distance variation of 42 km or a time variation of 140 $\mu$s. For a station located at the horizon on the equator, the altitude variation is reduced to 138 $\mu$s, but a long-term east-west variational component of 74 $\mu$s appears. In this case, north-south variation is negligible.

For a station located at the horizon in a plane including the axis of the earth's rotation and the satellite, the north-south component is maximum and results in a sidereal day period variation of 375 $\mu$s and an altitude sidereal day period variation of 138 $\mu$s. If the two components are in-phase, the peak-to-peak sidereal day variation becomes 513 $\mu$s. If the orbital plane inclination angle variation is reduced to $\pm 0.1$ degrees, the latter north-south contribution is reduced to 74 $\mu$s and the combination of both components becomes 212 $\mu$s. The maximum variation does not occur for this case, but in a plane 81 degrees relative to the one defined above, the maximum variation is 520 $\mu$s for a $\pm 0.5$ degrees orbital plane. If the orbital plane variation is reduced to $\pm 0.1$ degrees, the maximum variation occurs for a station at the horizon in a plane 45 degrees. In this case, the maximum variation is 244 μs.

Buffers at the earth terminals provided to accommodate the variations given above will eliminate the consequences of satellite motion from the clock stability problem. Then, the only remaining consideration is the uncertainty in the onboard clock. The onboard clock uncertainty will effectively be transferred to all satellite system terrestrial interfaces. Thus, the onboard satellite clock is literally a worldwide timing reference.

Due to weight and size restrictions, typically a satellite-born clock will have an uncertainty of no better than $\pm 10^{-9}$ per day. This is unacceptable for future proposed satellite communication systems. Since provision of an isolated reference clock on board the satellite with the desired small uncertainty is not economically conceivable with present technology as an atomic clock must be used to achieve the desired uncertainty, an alternate means of achieving the necessary level of uncertainty must be provided.

The onboard components of a previously proposed SS-TDMA switch as shown in FIG. 3 include a dynamic microwave switch matrix 14, a distribution control unit 12, and a timing unit or clock 10. The distribution control unit is programmed to provide a cyclic sequence of connections to the switch matrix 14 to execute desired beam interconnections. The timing of the cyclic sequence within the switch matrix 14 is controlled by the onboard clock 10.

The switch sequence may be considered to consist of individual stationary connection patterns called switch states. FIGS. 4(a) and 4(b) illustrate two ways of depicting switch states. FIG. 4(a) shows in crossbar matrix notation connections from various up-beams to down-beams indicated by dots at row-column intersections, and FIG. 4(b) shows in columnar notation connections from various up-beams identified in the terms of the down-beams to which connections are made.

Cascaded switch states form a switch state sequence such as the one shown in FIG. 5 which uses columnar notation. The switch state sequence is repeated at the SS-TDMA frame rate. Each frame is divided into a synchronization field, used for acquisition and synchronization of the satellite switch and for distribution of the TDMA reference bursts, and a traffic field, which provides the up-beam to down-beam connections needed to carry the traffic. This arrangement is shown on a 6×6 beam system as an example. FIG. 5 also shows a typical structure for the synchronization field. State I consists of a short state that provides loopback connections to the congruent beam to accomplish acquisition and synchronization by means of an acquisition and synchronization unit. This is called the synchronization window. State II is a short open connection state needed to terminate State I loopback connections, and State III is a reference burst distribution state. Other switch states comprise the traffic field. The following discussion is related to State I, which provides the loopback synchronization window connection for acquisition and synchronization of the satellite switch frame.

A block diagram of a known acquisition and synchronization unit 19 located at a reference earth station is shown in the lower portion of FIG. 3. In this unit, a phase error measurement circuit 20 receives signals picked up and amplified by an antenna-receiver 18. The operation of the phase error measurement circuit 20 will be explained in detail below. The digital output from the phase error measurement circuit 20 is fed to the control input of a programmable divider 26 and to the data input of an accumulator 22. The accumulator 22 is clocked once each sidereal day. The output of the accumulator 22 is fed to the control input of a voltage-controlled oscillator 28, the output of which is coupled to the clock input of the programmable divider 26.

The output pulses produced by the programmable divider 26 trigger a burst transmitter 24 which emits test or metering bursts which are transmitted to the satellite. The metering burst, which is fixed in format and which will be explained in further detail below, is used to carry out a measurement of the difference in time alignment between the bursts transmitted by the earth station and the synchronization windows set by the satellite.

The acquisition and synchronization unit 19 establishes and maintains synchronization between TDMA reference station bursts and the SS-TDMA frame, the timing of which is determined by the onboard clock. It has two modes of operation, acquisition and synchronization. In the acquisition mode, a special low-power, two-tone FSK-modulated burst is transmitted to locate the synchronization window with coarse accuracy. In the synchronization mode, a special metering burst is transmitted which permits accurate metering of the difference between the burst location and the trailing edge of the synchronization window. FIG. 6 illustrates the relationship of the metering burst to the trailing edge of the synchronization window.

The control function of the acquisition and synchronization unit 19 is organized so that the center of the metering burst is maintained at the trailing edge transition of the synchronization window. FIG. 7 illustrates the method of accomplishing the measurement. It is assumed that each metering segment contains 16 QPSK symbols and that each symbol carries two information bits. A stored bit pattern is used to generate the metering segment. A metering burst is transmitted and returned to the same controlling earth terminal. When the burst is returned after passage through the satellite switch, the received pattern is compared with the stored pattern and the number of correctly received bits counted. If the burst has been truncated precisely at midpoint, the first eight symbols will contribute 16 correct counts, while the last eight (which have been eliminated) will have states determined by random occurrence, and therefore will contribute an average of only eight correct counts. Thus, when an average of 24 correct counts are received for each metering segment, the center of the metering burst is centered on the trailing edge of the synchronization window. The trailing edge intersection may also be determined by the bit count transition of adjacent symbol positions.

Because a large number of samples are needed to achieve sufficient accuracy, a set of L metering bursts is used in the averaging process. Typically, L will be 32 or 64. When all factors involved are accounted for, including channel error rate, turn-off transitions, and statistical variance due to sample size, the accuracy of the method is ±1 symbol period for a 120-Mbit/s TDMA transmission rate.

The operation of the acquisition and synchronization unit shown in FIG. 3 will now be described. It is assumed that acquisition has taken place and that the acquisition and synchronization unit is maintaining the location of the metering segment of its burst transmission. Each TDMA frame, a burst is transmitted using timing derived from the local clock of the acquisition and synchronization unit using a programmable divider. Using the most recent set of L metering bursts, the phase error measuring circuit measures the displacement between the metering burst center and the synchronization processing. The result of this measurement, which is designated $x_i$, is supplied to both the programmable divider 26 and to an accumulator 22.

The programmable divider 26 immediately makes a displacement correction in the amount $x_i$ to realign its burst transmission in an attempt to reduce the displacement error to zero. Values of $x_i$ can be updated with a period no less than the round-trip propagation time to the satellite plus the duration of the sample smoothing interval.

The value of $x_i$ is also accumulated by the accumulator 22 over an interval of N observations of $x_i$ and used to generate long-term rate corrections for the voltage-controlled oscillator 48. The value of N is selected so that clock corrections occur at, for example, 20 second intervals. This action causes the local voltage-controlled oscillator 28 to track the onboard oscillator drift as well as the frequency variation due to Doppler effects. Thus, the acquisition and synchronization unit generates burst transmission timing at the earth station which aligns the arrival times of the metering burst center at the satellite precisely at the trailing edge of the synchronization window. This timing is also available to generate the reference bursts needed to control the TDMA network.

The acquisition and synchronization unit operation discussed thus far provides only a means of tracking the onboard oscillator of the satellite. Hence, onboard oscillator uncertainty is transferred to the entire TDMA network. This would be sufficient for plesiochronous operation only if the onboard oscillator inherently possessed the required $\pm 10^{-11}$ uncertainty which, as explained above, is not presently technically feasible.

Accordingly, it is an object of the present invention to provide a satellite clock system in which it is not necessary to provide an onboard clock in a satellite having an extremely small uncertainty and in which the overall system uncertainty is considerably better than that of the onboard clock of the satellite.

In a commonly assigned U.S. patent application Ser. No. 388,005, filed June 14 and entitled "Satellite Clock System", a satellite clock system is disclosed in which the satellite clock is implemented as a voltage-controlled oscillator having a relatively high uncertainty. Digital values are telemetered to the satellite to set and correct the frequency of the voltage-controlled oscillator so that the overall uncertainty of the output pulses of the onboard oscillator in the satellite over long periods of time is greatly improved.

To compute the values which are telemetered to the satellite, a metering burst is transmitted from an earth station to the satellite. The metering burst is timed with a high-stability reference oscillator located on the ground. The metering burst contains a predetermined pattern of symbols, such as psuedo-noise sequence symbols. The symbol pattern may be incorrectly truncated at the satellite due to misalignment between the burst and the synchronization windows timed by the onboard oscillator in the satellite. The metering burst is returned to the same earth station from which it was transmitted and the symbol pattern of the received burst is compared with the stored pattern. The bits which were truncated due to misalignment between the burst and the synchronization window of the satellite will have a random pattern and hence, on the average, only half of them will correspond to the correct symbols. Thus, by computing an average of the number of incorrect comparisons between a number of received bursts and the stored symbol pattern of the bursts, a value is determined which corresponds to the time amount of misalignment between the metering bursts and synchronization window.

The timing of the metering bursts is accomplished with a very high-stability, low uncertainty oscillator, the output of which is passed through a programmable divider. The output value from the phase error measurement is fed to the control inputs of the programmable divider to provide a short-term correction.

The output values from the phase error measurement are also accumulated over a sidereal day period to provide a sidereal day phase shift value. At the end of each sidereal day, the current value of sidereal day phase shift is summed with all previous daily values of the sidereal day phase shift to thus compute a cumulative phase shift from the beginning of the satellite system operation to the current day. The current sidereal day phase shift and the cumulative phase shift are then summed to produce a predicted phase correction value which will be in effect over the next sidereal day. The actual phase correction for the next sidereal day is produced by dividing the sum of the current sidereal day phase shift and the cumulative phase shift by a value representative of the length of a sidereal day. To compute the actual daily frequency correction, all values of the sidereal day frequency correction are summed, and this cumulative frequency correction value is telemetered to the satellite. In the satellite, the cumulative frequency correction value is used directly to set the output frequency of a voltage-controlled oscillator. If desired, the accumulation of the frequency correction can be performed onboard the satellite, in which instance the values of the sidereal day frequency correction are telemetered from the ground station to the satellite.

Referring to FIG. 8, there is shown therein a block-schematic diagram of a satellite and acquisition and synchronization unit constructed in accordance with the teachings of said application Ser. No. 388,055. In this system, a relatively high uncertainty voltage-controlled oscillator is utilized as the onboard clock for the satellite. The output frequency of the voltage-controlled oscillator 48 is set by the output of a correction frequency memory 46. The value stored in the correction frequency memory 46 is transmitted from the earth station through the telemetry interface 44.

The acquisition and synchronization unit in the earth station includes a phase error measurement circuit 20, a programmable divider 26 and a burst transmitter 24, as in the previously-known system. However, here the oscillator used by the acquisition and synchronization unit in the ground station is a high-stability, low uncertainty clock oscillator, which may, for example, be a cesium clock. Preferably, this oscillator has an uncertainty of $\pm 10^{-11}$ per day or better.

The output incremental frame correction values outputted by the phase error measurement circuit 20 are inputted to a first accumulator 32. The first accumulator 32 is clocked once each sidereal day. The output of the first accumulator 32 is fed directly to one input of a digital adder 36 and through a second accumulator 34, which is also clocked at an interval of one sidereal day, to the other input of the digital adder 36. The output of the digital adder 36 is fed to one input of a multiplier 38, the other input of which receives a fixed value of 1/T, where T corresponds to the period of one sidereal day. The output of the multiplier 38 is fed to the input of a third accumulator 40. The output of the third accumulator 40, which corresponds to a cumulative frequency correction from the start of the satellite operation to the present day, is sent through telemetry interface 42 to the telemetry interface 44 of the satellite and thence to the correction frequency memory 46.

As mentioned above, the metering bursts transmitted by the burst transmitter 24 are timed with pulses produced by the programmable divider 26, which is clocked by high-stability pulses from the oscillator 30. As in the case of previous systems, the bursts re-transmitted by the satellite are truncated by the trailing edge of the satellite switch synchronization window.

The truncated metering burst is transmitted back to the acquisition and synchronization unit and analyzed in the phase-metering circuit, as in the previous systems. An output $x_i$ is produced, which is the average positional displacement between the center of the metering segment and the trailing edge of the loopback switch state control signal. The value $x_i$ is used by a programmable divider to correct the observed displacement, again as in the previously known arrrangement. The minimum interval between corrections is the sum of the round-trip propagation time and the duration of the smoothing interval.

In accordance with said application Ser. No. 388,005, the values of $x_i$ are accumulated over each sidereal day by a first accumulator 32, after which the value of the $S_n$ is read out. During a sidereal day, the satellite completes its diurnal orbital oscillation, which cancels the diurnal periodic contribution in the value of $S_n$. Thus, any north-south or altitude variations which have a sidereal day period are eliminated. As a consequence, $S_n$ represents only the onboard clock drift and the east-west satellite position drift. If the east-west drift were zero, the value of the $S_n$ would represent the total sidereal day phase shift (in TDMA symbols) between the onboard clock and the ground-based reference oscillator.

Each sidereal day, the current value of $S_n$ is summed with all previous values since start-up of operations by a second accumulator 34 to form an output $\Sigma_N$. This output represents the cumulative phase shift from the beginning of operations between the onboard clock (voltage-controlled oscillator 48) and the ground-based reference oscillator 30. If the east-west drift were zero and the rate of drift of the onboard clock were constant, at the end of a sidereal day the value $S_n$ would be zero and $\Sigma_N$ would represent the correction needed to compensate for the next day's drift. In practice, changes in the satellite clock drift characteristics and the rate of east-west drift cause the value of the $S_n$ to be nonzero. Hence, $\Sigma_N$ will vary as the control loop attempts to maintain a zero daily average between the apparent onboard clock frequency and the ground-based reference oscillator. (The apparent onboard clock frequency differs from the true frequency because changes in range due to east-west drift are interpreted by the phase-measuring circuit as a change in frequency.)

To obtain the phase correction which will be in effect over the next sidereal day, the value $S_n$ is added to $\Sigma_N$ by a digital adder 36. This is done in the anticipation that the same value of $S_n$ will also occur the next day. This operation constitutes prediction. As a result, the frequency of the corrected onboard clock approaches a zero daily mean relative to the high-accuracy ground-based oscillator. Finally, the phase correction $\Sigma_N + S_n$ is converted to a frequency correction, $\mathring{\Delta}f_N$ by dividing by the duration of a sidereal day (in TDMA symbols) with a digital multiplier having a fixed value of 1/T inputted at one input thereof.

The daily frequency correction $\mathring{\Delta}f_N$ is summed by a third accumulator 40 with all preceding values of $\mathring{\Delta}f_N$ to form the current frequency offset $\Delta f_N$ between the uncorrected onboard clock frequency and the high-accuracy reference oscillator. This final accumulator 40 can be on the satellite or on the ground. Depending on its location either $\mathring{\Delta}f_N$ or $\Delta f_N$ is telemetered through telemetry interfaces 42 and 44 to the satellite once per sidereal day. To preserve near-zero daily average error characteristics, the correction should be transmitted to the satellite as soon as possible after computation.

FIG. 9(a) illustrates the operation of the unit of FIG. 8 assuming a continuous ramp clock drift function and zero east-west drift. Note that in the absence of control, the onboard clock frequency would depart from the reference $f_o$ at a rate f. The corrected onboard clock executes a peak-to-peak sawtooth variation of magnitude fT centered about a mean $f_o$, where T is the interval between corrections. Over the long term, subsequent to a start-up transient, the average deviation about the mean $f_o$ is zero.

The worst-case error occurs when the onboard clock executes a step oscillation between $\pm \Delta f/2$ from day to day, as illustrated in FIG. 9(b). This will result in a maximum offset bound by an interval of $\pm 2\Delta f$. This variation can be absorbed in terrestrial plesiochronous interface buffers by augmenting their size by an amount sufficient to accommodate the resulting phase shift over a sidereal day period T. The amount of needed augmentation is given by:

$$\Delta \tau = 4 \Delta f / f_o T$$

If $\Delta f/f_o = 10^{-9}$ per day and T=86,160 sec., $\Delta \tau = 0.345$ ms.

As will be obvious from the above, the onboard clock in satellite-switched time-division multiple access (SS-TDMA) and baseband processing satellites supplies the reference timing to the participating earth stations, and its long term drift must be controlled within an acceptable range for terrestrial network synchronization. The onboard clock correction method proposed in said application Ser. No. 388,005 and in S. J. Campanella, "Synchronization of SS/TDMA Onboard Clocks," *International Telemetry Conference*, San Diego, Calif., October 1980 (Abstract only) [Reference 1]; S. J. Campanella and T. Inukai, "SS/TDMA Frame Synchronization," *Proceedings of the International Conference on Communications*, Denver, Colo., June 1981, pp. 5.5.1–5.5.7 [Reference 2]; and T. Inukai and S. J. Campanella, "Onboard Clock Correction for SS/TDMA and Baseband Processing Satellites," *COMSAT Technical Review*, Vol. 11, No. 1, Spring 1981, pp. 77–102 [Reference 3], is optimized for an arbitrary drift, but it is not necessarily optimum for a clock in which the drift is predictable over a certain time interval. Since long-term drift of a crystal clock is regarded as almost linear with time, other techniques may be used more effectively to correct the onboard clock drift.

SUMMARY OF THE INVENTION

It is therefore an object of this invention to provide an onboard clock correction technique which is more effective for highly predictable clock drift which is characteristic of the crystal clocks typically used in communications satellites.

Briefly, the technique according to the present invention utilizes a polynomial approximation of cumulative phase error to estimate the clock drift in the current correction interval, and the correction value sent to the satellite is computed from the predicted drift in the next correction interval. A general correction procedure according to this invention may take into account the effects of quantization error, Doppler shift and prediction error.

BRIEF DESCRIPTION OF THE DRAWINGS

FIG. 1 is a broad schematic view showing a multiple-station satellite network of a type to which the invention may be applied to advantage;

FIGS. 2(a)–2(c) are a series of diagrams utilized to illustrate the various movements of a satellite during a sidereal day;

FIG. 3 is a block diagram of a satellite and acquisition and synchronization unit of the prior art;

FIGS. 4(a) and 4(b) are diagrams showing switch state notations corresponding to switching states of a switching matrix in a satellite;

FIG. 5 is a diagram of a satellite-switched time-division multiple access frame format showing various switching states;

FIGS. 6 and 7 are timing diagrams showing the alignment between a metering burst as transmitted by an earth station and a synchronization window, the timing of which is set by the onboard oscillator in the satellite;

FIG. 8 is a block diagram showing a prior art satellite and an acquisition and synchronization unit;

FIGS. 9(a) and 9(b) are graphical illustrations of frequency deviations of an onboard clock oscillator both with and without the use of the system of FIG. 8;

FIG. 10 is a block diagram showing an onboard clock correction diagram for an SS-TDMA system employing an acquisition and synchronization unit according to the present invention;

FIG. 12 is a diagram illustrating the relationships among the various parameters used in the clock correction algorithm according to the present invention;

FIGS. 14(a) and 14(b) are graphs illustrating the quantization effect of correction data on the clock drift and cumulative phase error;

FIGS. 15(a) and 15(b) are graphs illustrating the effect of prediction error on the clock drift and cumulative phase error;

FIGS. 16(a) and 16(b) are graphs illustrating the effect of delayed correction on the clock drift and cumulative phase error.

DESCRIPTION OF THE PREFERRED EMBODIMENT

Figure 11:
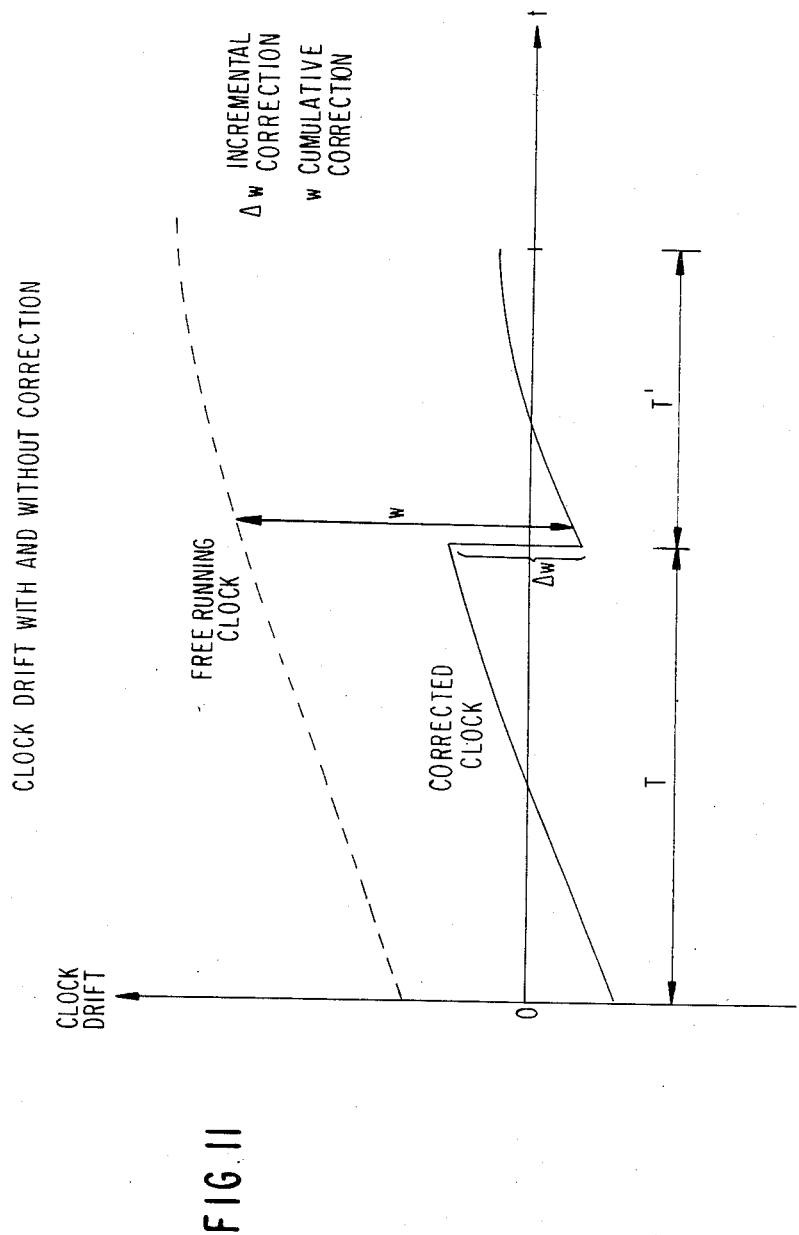
FIG. 11 is a diagram illustrating the effect of clock correction on the onboard oscillator.

FIG. 10 shows an onboard clock correction diagram for an SS-TDMA system employing an acquisition and synchronization unit (ASU) for phase error measurements. The improvement according to this invention resides in the clock correction algorithm processor 100 shown in FIG. 10 and indicated by the dotted outline in FIG. 8. Rather than including the components 34–40 in FIG. 8, the clock correction algorithm processor 100 in the present invention determines the clock correction value by curve-fitting the determined phase errors in accordance with a polynomial function, updating the polynomial function coefficients so as to minimize discrepancy between the determined phase errors and those according to the polynomial function, predicting a clock drift in accordance with the polynomial function and calculating an error correction value in accordance with the predicted clock drift. More particularly, the ASU transmits a metering burst and detects its timing error $x_i$, which is accumulated over $T_0$ seconds, to generate a long-term phase error $s_k$. ($T_0$ is typically from a few hours to one day.) The phase error measurement is repeated n times over a correction interval $T = nT_0$, and cumulative correction w is sent to the satellite to compensate for the future clock drift. FIG. 11 illustrates the effect of clock correction on the onboard oscillator. The cumulative correction is determined by minimizing the estimated cumulative phase error at the end of the next correction interval $T' = mT_0$. The successive correction intervals are not necessarily equal, and any integer multiple of $T_0$ can be chosen for each interval. This flexibility provides a cushion in the system to absorb unexpected (unpredictable) clock drift. The concept of this invention can also be applied to onboard processing and scanning beam satellites as described in Reference [3].

A cumulative phase error is the integral of correction error as disclosed in Reference [3] and is expressed by $$y(t) = y_0 + \int_{t_0}^{t} [\rho(\tau) - w] d\tau, \quad t_0 \leq t_0 + T \quad (1)$$

where $t_0$ = correction interval start time
$T$ = correction interval length ($= nT_0$, n: integer)
$T_0$ = phase error measurement period
$\rho(t)$ = free running oscillator drift ($= \Delta f/f_0$)
$w$ = cumulative correction for interval $[t_0, t_0 + T]$
$y_0$ = initial phase error [$= y(t_0)$]

Phase error $y(t)$ is periodically sampled at time $t_i = t_{i-1} + T_0$, $1 \leq i \leq n$, and the sampled values are given by $$y_i = y(t_i) = y_{i-1} + s_i, \quad 1 \leq i \leq n \quad (2)$$

where $s_i$ is a long-term phase error measured over $T_0$ seconds:

$$s_i = \int_{t_{i-1}}^{t_i} [\rho(\tau) - w] d\tau \quad (3)$$

The relationships of various parameters are shown in FIG. 12.

The measured cumulative phase errors are curve-fitted by the following k-th order polynomial function:

$$y_a(t) = a_0 + \sum_{i=1}^{k} a_i \left(\frac{t-t_0}{T_0}\right)^i, \quad t_0 \leq t \leq t_n \quad (4)$$

From equation (1), correction error $[\rho(t)-w]$ is approximated by $$\rho_a(t) = \frac{d}{dt}[y_a(t)] = \frac{a_1}{T_0} + \sum_{i=2}^{k} \frac{ia_i}{T_0}\left(\frac{t-t_0}{T_0}\right)^{i-1} \quad (5)$$

In the above equations, the coefficients $a_i$, $0 \leq i \leq k$, are obtained by minimizing a mean-square error:

$$\epsilon = \sum_{j=0}^{n} [y_a(t_j) - y_j]^2 = \sum_{j=0}^{n} \left[a_0 + \sum_{i=1}^{k} j^i a_i - y_j\right]^2 \quad (6)$$

$$\frac{\partial \epsilon}{\partial a_0} = \sum_{j=0}^{n} 2\left[a_0 + \sum_{i=1}^{k} j^i a_i - y_j\right] = 0 \quad (7a)$$

$$\frac{\partial \epsilon}{\partial a_p} = \sum_{j=0}^{n} 2\left[a_0 + \sum_{i=1}^{k} j^i a_i - y_j\right] j^p = 0, \quad 1 \leq p \leq k \quad (7b)$$

From equations (7a) and (7b)

$$(n+1)a_0 + \sum_{i=1}^{k}\left(\sum_{j=1}^{n} j^i\right) a_i = \sum_{j=0}^{n} y_j \quad (8a)$$

$$\left(\sum_{j=1}^{n} j^p\right) a_0 + \sum_{i=1}^{k}\left(\sum_{j=1}^{n} j^{i+p}\right) a_i = \sum_{j=1}^{n} j^p y_j, \quad 1 \leq p \leq k \quad (8b)$$

To write these equations in matrix form, the following notations must be defined:

$$b(m, n) = \sum_{j=1}^{n} j^m$$

$$K = \begin{bmatrix} n+1 & b(1, n) & \ldots & b(k, n) \\ b(1, n) & b(2, n) & \ldots & b(k+1, n) \\ \vdots & & & \vdots \\ b(k, n) & b(k+1, n) & \ldots & b(2k, n) \end{bmatrix}$$

$$H = \begin{bmatrix} 1 & 1 & 1 & \ldots & 1 \\ 0 & 1 & 2 & \ldots & n \\ 0 & 1 & 2^2 & \ldots & n^2 \\ \vdots & & & & \vdots \\ 0 & 1 & 2^k & \ldots & n^k \end{bmatrix}$$

$$A = [a_0 \, a_1 \ldots a_k]'$$
$$Y = [y_0 \, y_1 \ldots y_n]'$$

Then a matrix form of equations (8a) and (8b) is given by $$KA = HY \quad (9)$$

and the desired coefficients are simply the solution of this equation, i.e., $$A = K^{-1} HY \quad (10)$$

Function $y_a(t)$ approximates cumulative phase error $y(t)$ in the interval $[t_0, t_n]$. If the long-term drift does not change abruptly, $y_a(t)$ can be used to extrapolate $y(t)$ in the next correction interval $[t_n, t_{n+m}]$, where $t_{n+m} = t_n + T' = t_n + mT_0$. The incremental correction, $\Delta w$, is then chosen in such a way that the estimated cumulative phase error becomes zero at the end of the following correction interval. Thus, $\Delta w$ must satisfy the next equation:

$$y(t_n) + \int_{t_n}^{t_{n+m}} [\rho_a(\tau) - \Delta w] d\tau = 0 \quad (11)$$

Using equation (5), $$\Delta w = \frac{1}{mT_0}\left[y(t_n) + \sum_{i=1}^{k} \{(n+m)^i - n^i\} a_i\right] \quad (12)$$

The new cumulative correction, $w'$, is the sum of the previous correction $w$ and the incremental correction $\Delta w$.

$$w' = w + \Delta w \quad (13)$$

CORRECTION OF LINEAR CLOCK DRIFT

Regarding the correction of linear clock drift, the clock correction equation (12) is applied to the linear drift to examine its effectiveness. A fixed interval is chosen for each correction, i.e., $m = n$ in equation (12).

One critical item which has an impact on traffic station design is the size of the buffer required to absorb the clock correction error. This is denoted by $B_c$ and is given by $$B_c = 2[\max\{y(t)\} - \min\{y(t)\}] \quad (14)$$

where a traffic station has no knowledge of the cumulative phase error in the ASU; otherwise, $B_c$ is half of equation (14).

The first-order (or linear) prediction is a linear approximation of $\rho(t)$ and is characterized by the following set of equations:

$$y_a(t) = a_0 + a_1\left(\frac{t-t_0}{T_0}\right) + a_2\left(\frac{t-t_0}{T_0}\right)^2 \quad (15a)$$

$$\rho_a(t) = \frac{a_1}{T_0} + \frac{2a_2}{T_0}\left(\frac{t-t_0}{T_0}\right) \quad (15b)$$

$$\Delta w = \frac{1}{T}[y(t_n) + na_1 + 3n^2 a_2] \quad (15c)$$

The linear drift to be compensated is given by $$\rho(t) = \rho_0 + \Delta\rho(t/T), \quad t > 0 \quad (16)$$

and all the initial parameter values are set to zero. The results of the first-order prediction are shown in Table 1 and FIG. 13. The traffic station buffer size, after two transient intervals, is $$B_c = 2(\Delta\rho T/8) = \Delta\rho T/4 \quad (17)$$

TABLE 1

First-Order Prediction Parameters for Linear Drift

| | Initial Value | Interval 1 | Interval 2 | Interval k (k ≥ 3) |
|---|---|---|---|---|
| $a_1$ | 0 | $\rho_0 T_0$ | $-(\rho_0 + \Delta\rho) T_0$ | $-\dfrac{\Delta\rho T_0}{2}$ |
| $a_2$ | 0 | $\dfrac{\Delta\rho T_0^2}{2T}$ | $\dfrac{\Delta\rho T_0^2}{2T}$ | $\dfrac{\Delta\rho T_0^2}{2T}$ |
| $y_o$ | 0 | $\left(\rho_0 + \dfrac{\Delta\rho}{2}\right) T$ | 0 | 0 |
| $\Delta w$ | 0 | $2\rho_0 + 2\Delta\rho$ | $-\rho_0 + \dfrac{\Delta\rho}{2}$ | $\Delta\rho$ |
| $w$ | 0 | $2\rho_0 + 2\Delta\rho$ | $\rho_0 + \dfrac{5}{2}\Delta\rho$ | $\rho_0 + \left(n + \dfrac{1}{2}\right)\Delta\rho$ |

A higher-order polynomial [$k \geq 3$ in equation (4)] generally gives a better approximation; however, it does not necessarily yield a better prediction. On the contrary, a small deviation in the measured data may cause a large prediction error. The optimum value of the polynomial order should be determined based on the long-term drift characteristics of a typical crystal clock over a correction interval.

QUANTIZATION, DOPPLER, AND PREDICTION ERRORS

The accuracy of clock correction is degraded by the correction data quantization, Doppler effect on phase error measurements, and prediction error. Regarding quantization, the cumulative correction, w, is rounded to the nearest value of finitely possible numbers before its transmission to the satellite. This quantization affects the accuracy of subsequent phase error measurements. Suppose that $e_i$ denotes the quantization error of correction $w_i$ in the i-th interval. Equation (1) can be modified to include the quantization error as follows:

$$y(t) = y(t_{i-1}) + \int_{t_{i-1}}^{t} [\rho(\tau) - w_i - e_i] d\tau \qquad (18)$$

where $t_i = t_{i-1} + T$ and $T = nT_0$ for $i \geq 1$ (fixed correction interval.) The phase error due to quantization is obtained by setting $\rho(t) = 0$ in equation (18). The maximum quantization error is bounded by $e/2$, i.e., $|e_i| \leq e/2$, where e is a quantization step size. Using this bound, the worst-cast phase error is easily computed:

$$|y(t_i)| \leq eT \qquad (19)$$

The required buffer size to absorb the quantization error, $B_q$, is obtained from this bound:

$$B_q = 4eT \qquad (20)$$

FIG. 14 shows the quantization effect of correction data on the clock drift and cumulative phase error.

The effect of quantization can be minimized by employing the following technique. Since the quantization error, $e_i$, is known to the ASU, its effect on phase error measurements can be calculated precisely. During each phase error measurement, subtract $(-e_i T_0)$ from $s_k$ in equation (3) to yield a new $s_k$, which does not contain the quantization error. This procedure reduces the required traffic station buffer size to $B_q = 2eT$.

Periodic phase error measurement $s_k$ also contains the phase shift caused by satellite movement during the measurement interval $T_0$. The contribution of this phase shift is $\Delta r/c$, where $\Delta r$ is the effective range variation (range change in successive phase error measurements) and c is the propagation speed. This error term will be miscompensated in the next correction interval and will produce a larger phase shift. It is rather difficult to accurately estimate the effect of Doppler shift on the clock correction method since various station keeping maneuvers may be performed during phase error measurements. However, the phase error caused by range variation may completely be eliminated from $s_k$. The effective range variation is precisely computed from the satellite range measurements and its effect is subtracted from $s_k$. The ASU can easily accommodate the range measurement function using metering bursts.

A prediction error increases the magnitude of cumulative phase error and thus requires a larger traffic station buffer. Consider the following predicted and actual drift functions, $$\rho_a(t) = \Delta\rho(t/T) - \Delta\rho/2, \; 0 \leq t \leq T \qquad (21)$$

$$\rho(t) = (1 \pm \epsilon)\Delta\rho(t/T) - \Delta\rho/2, \; 0 \leq t \leq T \qquad (22)$$

where clock drift $\rho(t)$ has a slightly different slope than predicted drift $\rho_a(t)$ as shown in FIG. 15A. The initial phase error is zero at the beginning of the correction interval, i.e., $y(0) = 0$. The cumulative phase error at time t, $0 \leq t \leq T$, is given by $$y(t) = \int_0^t \rho(\tau) d\tau = \Delta\rho(1 \pm \epsilon/2T)t^2 - \Delta\rho/2t \qquad (23)$$

This function is plotted in FIG. 15B. The relative increase in phase error caused by a slope prediction error of $\pm\epsilon$ is $$x = \frac{\epsilon \Delta\rho T/2 + \Delta\rho T/[8(1-\epsilon)] - \Delta\rho T/8}{\Delta\rho T/8} = 4\epsilon + \frac{\epsilon}{(1-\epsilon)} \qquad (24)$$

where $0 \leq \epsilon \leq 0.5$. From this equation, the cumulative phase error increases by 5, 25, and 51 percent for $\epsilon = 0.01, 0.05$, and 0.1, respectively. The same amount of increase is required for a traffic station buffer, i.e., $$B_p = xB_c \qquad (25)$$

CLOCK CORRECTION PROCEDURE

A traffic station buffer size $B_t$ is the sum of various terms causing a nonzero phase error, $$B_t = B_c + B_q + B_p + B_d + B_o + B_m \qquad (26)$$

where the first three terms are respectively given by equations (17), (20), and (25). $B_d$ is the buffer increase resulting from the delay $\Delta T$ incurred in transferring correction data to the satellite. (The TT&C link may not be available for an immediate transmission of correction data). From FIG. 16, $$B_d = 2(\Delta \rho \Delta T/2) = \Delta \rho \Delta T \qquad (27)$$

Term $B_0$ is allocated for internal computational accuracy of finite precision, short-term phase measurement error, interpolation error during a short system outage period, etc., and is generally quite small. The last term, $B_m$, is an implementation margin and will be discussed later. The Doppler component is not included in equation (26). If the Doppler effect is not completely removed from phase error measurements, an additional term should be included in the equation. Equation (26) can be used to determine a nominal correction interval T for given system parameters.

The clock correction procedure described herein assumes a k-th order ($k \geq 2$) polynomial approximation for cumulative phase error, and almost linear drift with a maximum drift of $\Delta \rho$ is considered. The direction of drift can be measured during the first correction interval; a positive drift is assumed in the following, i.e., $\Delta \rho \geq 0$.

Figures 13A, 13B:
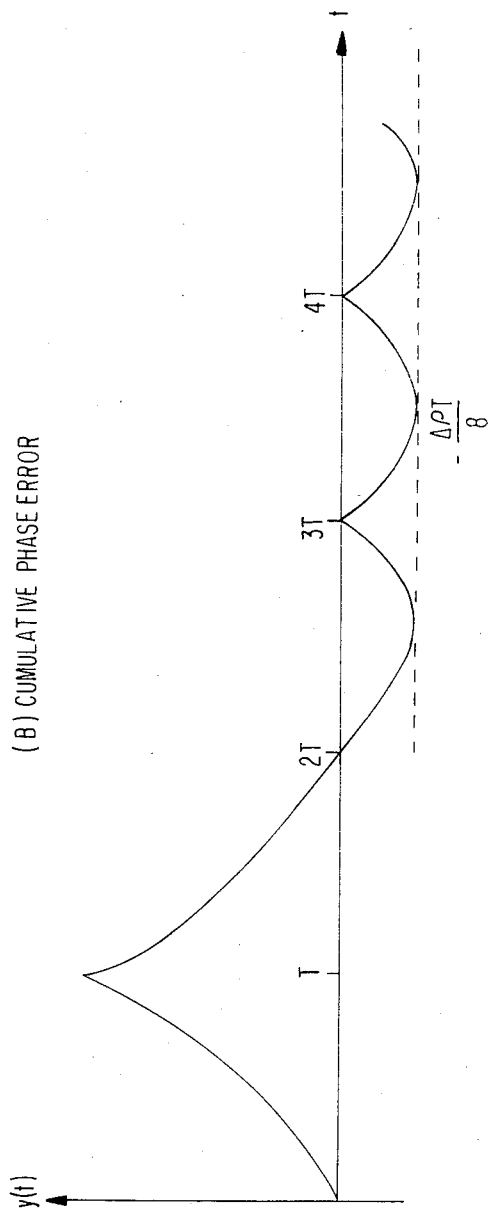
FIGS. 13(a) and 13(b) are graphs illustrating the first-order linear prediction results of Table 1.

From FIG. 13, the cumulative phase error is bounded by $$y_{min} = -\Delta \rho T/8 \leq y(t) \leq 0 = y_{max} \qquad (28)$$

for a perfectly linear drift. For other error terms, y(t) is confined within the following bounds:

$$Y_{min} \leq y(t) \leq Y_{max} \qquad (29a)$$

$$Y_{min} = y_{min} - \Delta y_q - \Delta y_{p1} - \Delta y_0 \qquad (29b)$$

$$Y_{max} = y_{max} + \Delta y_q + \Delta y_{p2} + \Delta y_d + y_0 \qquad (29c)$$

where $\Delta y_q = B_q/4$, $\Delta y_d = B_d/2$, $\Delta y_0 = B_0/4$, and $\Delta y_{p1}$ and $\Delta y_{p2}$ are obtained from FIG. 6:

$$\Delta y_{p1} = \frac{\Delta \rho T}{8(1-\epsilon)} - \frac{\Delta \rho T}{8} = \frac{\epsilon \Delta \rho T}{8(1-\epsilon)} \qquad (30a)$$

$$\Delta y_{p2} = \frac{\epsilon \Delta \rho T}{2} \qquad (30b)$$

Figure 17A:
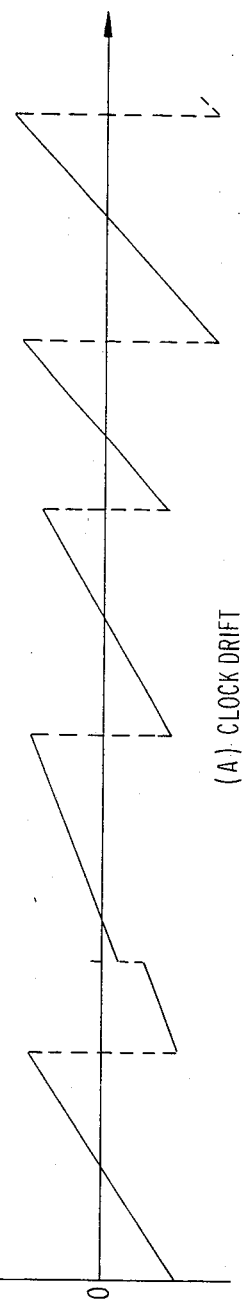
FIGS. 17(a) and 17(b) are graphs illustrating the effects of lower and upper thresholds on the clock drift and cumulative phase error.
Figure 17B:
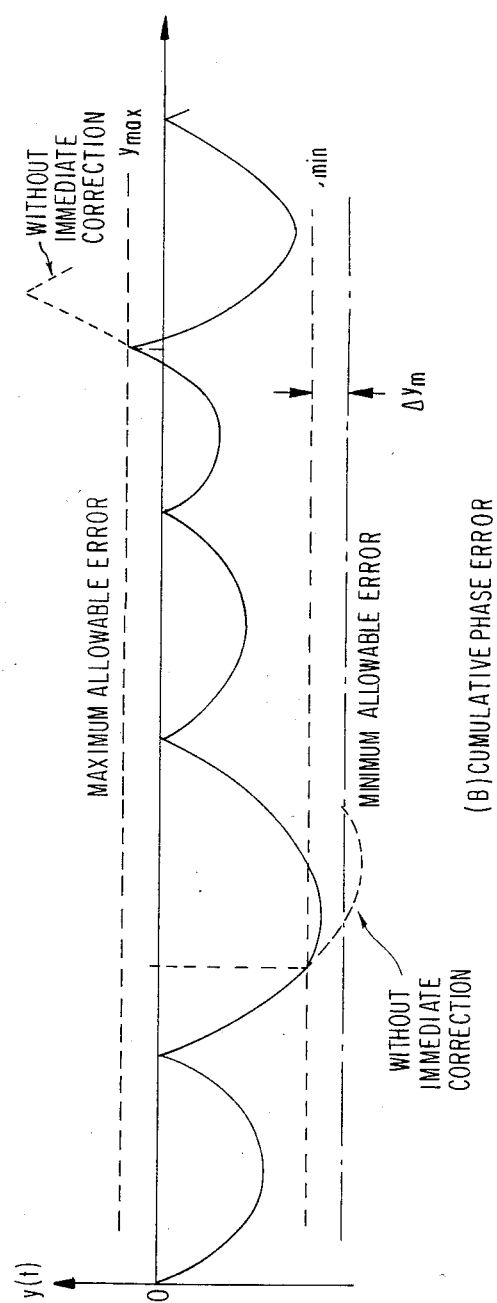

Note that $B_p = 2(\Delta y_{p1} + \Delta y_{p2})$. The extreme values, $Y_{min}$ and $Y_{max}$, are called the lower and upper threshold of y(t), respectively, and the cumulative phase error should not exceed these values in most cases. If it does exceed one of the thresholds at some phase measurement time, corrective action must be taken immediately. That is, the current correction interval must be terminated, a new correction must be sent to the satellite, and the next correction interval started. FIG. 15 shows two locations where an over-threshold phenomenon is most likely to occur: in the middle and at the end of the correction interval. The effect of corrective action is shown in FIG. 17, where $\Delta y_m$ is an error margin to absorb a small phase shift following a clock correction. A buffer to absorb this phase error, denoted by $B_m = 2\Delta y_m$, depends on the predictability of clock drift.

The above discussion assumed that the direction of long-term clock drift is either positive or negative throughout the satellite lifetime. However, changes in various system parameters such as temperature, power supply voltage, and oscillator circuit components can cause the clock to drift in the opposite direction. If this is the case, the following adjustments must be made in the threhold values. For instance, equation (28) must be replaced by $$y_{min} = -\Delta \rho T/8 \leq y(t) \leq \Delta \rho T/8 = y_{max} \qquad (31)$$

and $B_c$ is doubled, i.e., $$B_c = \Delta \rho T/2 \qquad (32)$$

From FIG. 15 and equation (24), the slope prediction error of $0 \leq \epsilon \leq 0.25$, results in the following parameter changes:

$$\Delta y_{p1} = \Delta y_{p2} = \frac{\epsilon \Delta \rho T}{8(1-\epsilon)} \qquad (33a)$$

$$B_p = xB_c \qquad (33b)$$

$$X = \frac{\epsilon}{1-\epsilon} \qquad (33c)$$

Since the phase error caused by transmission delay is smaller than $\Delta \rho T/8$, $\Delta y_d = B_d \cong 0$ in equation (29c). The implementation margin is related to the phase error by $B_m = 4\Delta y_m$, and the quantization term remains unchanged.

EXAMPLE

The clock correction procedure presented in the previous sections is illustrated for the following design parameters:

a. clock drift $(\Delta \rho_s) \leq 5 \times 10^{-11}$ per day,
b. measurement period $(T_0) = 86,164$ s (sidereal day),
c. correction interval $(T) = nT_0$ (n to be determined),
d. VCO resolution $(e) = 4 \times 10^{-11}$, and
e. traffic station buffer $(B_T) = 500$ μs.

If a digitally controlled oscillator (DCO) is employed, the correction resolution can be improved to $1 \times 10^{-11}$.

The maximum clock drift over a correction interval is $\Delta \rho = n \Delta \rho_s$. For a monotone drift function, the buffer requirement is calculated from equation (26), where a slope prediction error of 10 percent ($\epsilon = 0.1$) is assumed, and no more than 4 hours of transmission delay is allowed for correction data ($\Delta T = 4$ hr.). Buffer $B_0$ should not exceed 10 μs for this application. (The actual value of $B_0$ may be much smaller.) Implementation margin $B_m$ is estimated from FIG. 15 and the second term of equation (24) to allow an additional prediction error of $\pm \epsilon$ (total slope prediction error of $\pm 2\epsilon$):

$$B_m = \left( \frac{2\epsilon}{1-2\epsilon} - \frac{\epsilon}{1-\epsilon} \right) B_c = 0.14 B_c$$

The lower and upper thresholds are calculated from equations (29b) and 29c).

A simple computation shows that the maximum duration of a nominal correction interval is 13 sidereal days for the VCO approach (15 sidereal days for the DCO) to meet a 500-μs buffer requirement. Two major error terms in addition to clock drift are quantization and prediction errors, whereby the former can be significantly reduced by using a DCO and the procedure of eliminating the phase error caused by quantization.

If the clock drift can change its direction over the satellite lifetime, a larger buffer is required at traffic stations. For the above example, the maximum correction intervals of 11 and 12 sidereal days are expected for an on-board VCO and DCO, respectively.

The analysis of the novel onboard clock correction technique disclosed herein indicates its promise for compensating almost linear drifts. The actual hardware, or preferably software, needed to perform the clock correction algorithm will be easily apparent to one of ordinary skill in the art given the mathematical analysis and equations hereinabove. In its most basic form, the invention resides in the use of a polynomial to "curve-fit" the error data, minimizing the error between the polynomial results and the actual data by adjusting the polynomial coefficients, predicting the clock drift and then calculating the appropriate correction data based on the predicted drift. As used in the appended claims, the term "curve-fitting" of determined phase errors refers to the generation of a polynomial, e.g., of the form shown in equation (4) herein above, which defines a curve in which the determined phase error values fit as data points. This is preferably accomplished by beginning with a polynomial of the general form shown in equation (4), and then adjusting the coefficient values in order to minimize any differences between the determined phase errors and the results of the polynomial function at time points corresponding to each of the determined phase errors.

I claim:

1. In a method of operating a clock system, said method of the type comprising the steps of transmitting metering bursts to a satellite, determining an amount of phase error in an onboard clock of said satellite in response to re-transmitted bursts received from said satellite, and generating and transmitting to said satellite an error correction value for correcting said error in said onboard clock relative to said metering bursts, the improvement characterised in that said generating step comprises the steps of:
   curve-fitting said determined phase errors in accordance with a polynomial function having coefficient values including adjusting said coefficient values in order to minimize an error between said determined phase errors and phase errors predicted in accordance with said polynomial function;
   predicting an amount of clock drift in accordance with said polynomial function; and
   calculating said error correction value in accordance with said predicted amount of drift.

2. A method as defined in claim 1, wherein said step of determining an amount of phase error comprises determining said phase error over an interval $[t_0, t_n]$ by sampling said phase error at sampling intervals of $T_0$, where $t_n = t_0 + T$, $T = nT_0$, and n is an integer, said step of predicting said clock drift comprises predicting said clock drift for a succeeding interval $[t_n, t_{n+m}]$, where m is an integer, and said step of calculating said error correction valve comprises calculating a first correction value w for correcting said determined phase error and an incremental correction value $\Delta_w$ for correcting said predicted clock drift, and then calculating said error correction value w' substantially defined by $w' = w + \Delta_w$.

3. A method as defined in claim 2, wherein said incremental correction value w is substantially defined by:

$$\Delta w = \frac{1}{mT_0}\left[ y(t_n) + \sum_{i=1}^{k} \{(n + m)^i - n^i\}a_i \right]$$

where,
$y(t_n)$ is the phase error at time $t_n$,
k is an integer, and
$a_i$, $0 \leq i \leq k$ are said coefficients.

4. A method as defined in claim 1, wherein said step of determining an amount of phase error comprises sampling said phase error at intervals of $T_0$, said polynomial function is given by:

$$y_a(t) = a_0 + \sum_{i=1}^{k} a_i \left( \frac{t - t_0}{T_0} \right)^i, \quad t_0 \leq t \leq t_n$$

where,
$y_a(t)$ is an approximation of the cumulative phase error over an interval $[t_0, t_n]$ during which said phase error is sampled,
$a_0$ is one of said coefficients,
k is an integer, and
$a_i$, $0 \leq i \leq k$, are the remainder of said coefficients.

5. A method as defined in claim 4, wherein said step of determining an amount of phase error comprises determining said phase error over an interval $[t_0, t_n]$ by sampling said phase error at sampling intervals of $T_0$, where $t_n = t_0 + T$, $T = nT_0$, and n is an integer, said step of predicting said clock drift comprising predicting said clock drift for a succeeding interval $[t_n, t_{n+m}]$, where m is an integer, and said step of calculating said error correction value comprises calculating a first correction value w for correcting said determined phase error and an incremental correction value $\Delta w$ for correcting said predicted clock drift, and then calculating said error correction value w' substantially defined by $w' = w + \Delta w$.

6. A method as defined in claim 5, wherein said incremental correction value w is substantially defined by:

$$\Delta w = \frac{1}{mT_0}\left[ y(t_n) + \sum_{i=1}^{k} \{(n + m)^i - n^i\}a_i \right]$$

where $y(t_n)$ is the phase error at time $t_n$.

7. A method as defined in claim 1, further comprising detecting when an excessive phase error has occurred and transmitting an error correction value to said satellite in response to a detected excessive phase error.

8. A satellite clock system of the type comprising means for transmitting metering bursts to a satellite; means for determining an amount of phase error in an onboard clock of said satellite in response to re-transmitted bursts received from said satellite, and error correction means for generating and transmitting to said satellite an error correction value for correcting said error in said onboard clock relative to said metering bursts, the improvement characterized in that said error correction means comprises:

clock correction algorithm processing means for curve-fitting said determined phase errors according to a polynomial function having coefficients, said algorithm processing means adjusting the values of said coefficients in order to minimize an error between said determined phase errors and results of said polynomial function, determining a predicted clock drift in accordance with said polynomial function and calculating said error correction value in accordance with said predicted clock drift.

9. A satellite clock system as defined in claim 8, wherein said means for determining an amount of phase error determines said phase error over an interval $[t_0, t_n]$ by sampling said phase error at sampling intervals of $T_0$, where $t_n = t_0 + T, T = nT_0$, and n is an integer, said predicted clock drift is determined for a succeeding interval $[t_n, t_n + m]$, where m is an integer, and said error correction value is calculated by calculating a first correction value w for correcting said determined phase error and an incremental correction value $\Delta w$ for correcting said predicted clock drift, and then calculating said error correction value w' substantially defined by $w' = w + \Delta w$.

10. A satellite clock system as defined in claim 9, wherein said incremental correction value $\Delta w$ is substantially defined by:

$$\Delta w = \frac{1}{mT_0}\left[ y(t_n) + \sum_{i=1}^{k} \{(n+m)^i - n^i\}a_i \right]$$

where, y($t_n$) is the phase error at time $t_n$,
k is an integer, and
$a_i$, $0 \leq i \leq k$ are said coefficients.

11. A satellite clock system as defined in claim 8, wherein said means for determining an amount of phase error samples said phase error at intervals of $T_0$, said polynomial function being defined by:

$$y_a(t) = a_0 + \sum_{i=1}^{k} a_i \left( \frac{t - t_0}{T_0} \right)^i, \quad t_0 \leq t \leq t_n$$

where, $y_a(t)$ is an approximation of the cumulative phase error over an interval $[t_0, t_n]$ during which phase error is sampled,
$a_0$ is one of said coefficients,
k is an integer, and
$a_i$, $0 \leq i \leq k$, are the remainder of said coefficients.

12. A satellite clock system as defined in claim 11, wherein said means for determining an amount of phase error determines said phase error over an interval $[t_0, t_n]$ by sampling said phase error at sampling intervals of $T_0$, where $t_n = t_0 + T, T = nT_0$, and n is an integer, said predicted clock drift is determined for a succeeding interval $[t_n, t_n + m]$, where m is an integer, and said error correction value is calculated by calculating a first correction value w for correcting said determined phase error and an incremental correction value $\Delta w$ for correcting said predicted clock drift, and then calculating said error correction value w' substantially defined by $w' = w + \Delta w$.

13. A satellite clock system as defined in claim 12, wherein said incremental correction value $\Delta w$ is substantially defined by:

$$\Delta w = \frac{1}{mT_0}\left[ y(t_n) + \sum_{i=1}^{k} \{(n+m)^i - n^i\}a_i \right]$$

where y($t_n$) is the phase error at time $t_n$.

14. A satellite clock system as defined in claim 8, wherein the improvement is further characterized in that said error correction means detects when an excessive phase error has occurred and transmits an error correction value to said satellite in response to a detected excessive phase error.

* * * * *